United States Patent [19]

Nürnberger

[11] Patent Number: 5,445,573

[45] Date of Patent: Aug. 29, 1995

[54] MULTI-SPEED GEAR HUB

[75] Inventor: Günter Nürnberger, Schweinfurt, Germany

[73] Assignee: Fichtel & Sachs AG, Schweinfurt, Germany

[21] Appl. No.: 114,908

[22] Filed: Aug. 31, 1993

[30] Foreign Application Priority Data

Mar. 10, 1993 [DE] Germany .................... 93 03 507 U

[51] Int. Cl.$^6$ .................... F16H 3/44; B62M 11/16
[52] U.S. Cl. .................... 475/298; 475/279; 475/297; 192/48.6; 192/64
[58] Field of Search .............. 475/275, 279, 290, 291, 475/298, 297; 192/46, 48.6, 64, 6 A; 74/330, 356, 366, 368

[56] References Cited

U.S. PATENT DOCUMENTS 4,973,297  11/1990  Bergles .................... 475/298

FOREIGN PATENT DOCUMENTS

| 165740 | 4/1950 | Austria . |
| 549570A2 | 6/1993 | European Pat. Off. ............ 475/298 |
| 814982 | 9/1951 | Germany . |
| 4142867 | 7/1992 | Germany . |
| 405065094A | 3/1993 | Japan ....................... 475/298 |
| 2166502 | 5/1986 | United Kingdom . |

OTHER PUBLICATIONS

Zweirad-Magazin, Aug. 1992, pp. 6–10.
RadMarkt, Jul. 1992, pp. 46–49.
RadMarkt, Oct. 1992, pp. 36 & 37.
Radfahren EXTRA, Apr. 1992, pp. 8, 9, 12, 14–17.
Torpedo-Super-7 leaflet, Sep. 1992.
"Deutsche Firmen Wollen Aktiv Werden" article.

*Primary Examiner*—Charles A. Marmor
*Assistant Examiner*—Troy Grabow
*Attorney, Agent, or Firm*—Brumbaugh, Graves, Donohue & Raymond

[57] ABSTRACT

For free shifting in a multi-speed gear hub comprising a claw clutch, first and second springs are included for preloading a projecting claw part in mutually opposite directions. Preloading in the second direction is with less force than in the first direction, for abutment of the claw part on a driving member. Against the force of the first spring, the driving member is displaceable from abutment, into all gearshift positions following in the second direction. Gears preselected with stationary hub are engaged upon resumption of gear action.

14 Claims, 3 Drawing Sheets

MULTI-SPEED GEAR HUB

BACKGROUND OF THE INVENTION

The invention relates to a multi-speed gear hub, e.g., for bicycles.

A multi-speed gear hub disclosed in Austrian Patent Document 165,740 includes two claw clutches which are successively actuable by a single gearshift linkage part (connecting rod 36). From the initial gearshift position of the connecting rod, the (first) claw clutch nearest the driver gear wheel 41 is actuated first, the projecting claw part (gearshift sleeve 40) being movable from a first gearshift position with rotationally fixed connection between driver gear wheel and planet wheel carrier 17 into a second gearshift position with rotationally fixed connection between driver gear wheel and ring gear 11 and with active overriding clutch 12 between ring gear 11 and hub sleeve 33, and being movable further into a third gearshift position in which the driver gear wheel remains coupled with the ring gear, but in which the overriding clutch is inactive. This gearshift movement is effected against the force of a first preloading spring 38. In the three gearshift positions, the projecting claw part (sleeve 51) of the second claw clutch remains in its current gearshift position, in which it couples a sun wheel 25 of a supplemental planetary gear rotationally fixed with the hub shaft. This is possible as the associated driving member 54, which is rigidly connected with the connecting rod, engages the projecting claw part 51 for driving with a driving shoulder 54c only when the third gearshift position of the connecting rod is reached. A first preloading spring 57 preloads the projecting claw part into this gearshift position. If the connecting rod 36 is pulled further, the shoulder 54c drives the projecting claw part into an additional gearshift position in which the claw part releases the sun wheel of the supplemental planetary gear, and fixes a part 22 rotationally fixed on the hub shaft. Part 22 bears the sun wheels for the main planetary gear and also serves as planet wheel carrier for the supplemental planetary gear. To permit this connecting-rod movement while the projecting claw part (gearshift sleeve 40) of the first clutch is stationary, the projecting claw part is not rigidly fixed to the connecting rod, but is movable on the rod against the force of a spring 56 which suitably preloads the projecting claw part for abutment against the end of the connecting rod 36. The opposite end of this spring is supported on an annular shoulder of the driving member 54 which is screwed into a threaded opening of the connecting rod 36. The preloading force of the spring 56 is less than that of the first preloading spring 38.

This construction provides for the two clutches to be actuable successively by a single, tension-loaded gearshift linkage part. When the planetary gear is stationary, i.e., during standing or riding without pedaling, through-shifting by pulling out of the connecting rod into the end gearshift position opposite the initial gearshift position is reliably possible only when the counterprojecting claw parts 50, 53 are oriented alike, so that the projecting claw part 51 can be shifted axially between the two parts without difficulty.

Similarly, through-shifting is not possible in a multi-speed gear hub with a single connecting rod as represented in FIG. 1 of German Patent Document 814,982. This applies also to the embodiments according to FIGS. 4 and 5 of German Patent Document 814,982, as there the projecting claw parts are rigidly connected with the respective gearshift linkage part. Free through-shifting is precluded also in the multi-speed gear hubs with two claw clutches (5-speed hub) disclosed in British Patent Document 2,166,502, as in this case the pressure-loaded gearshift linkage parts directly abut the corresponding projecting claw parts. When shifting during standstill of the planetary gear upon actuation of the gearshift means, as the gearshift linkage parts are moved further into the hub against the force of first preloading springs, the movement of the gearshift linkage part is momentarily blocked unless the angles of corresponding projecting claws or counterprojecting claws happen to match.

SUMMARY OF THE INVENTION

Desired is a multi-speed hub which can be shifted through freely. To this end, for each claw clutch, a second preloading spring is included for preloading the respective projecting claw part in a second preloading direction opposite to the first preloading direction, with less force than the first preloading spring, for direct or indirect abutment of the driving member, which member is displaceable from abutment with the projecting claw part, in a direction parallel to the second preloading direction against the force of the first preloading spring, into all gearshift positions following in the second direction.

A preferred embodiment comprises a hub shaft mountable on a bicycle frame, a driver rotatable about an axis of rotation on the hub shaft, a hub sleeve rotatable on the hub shaft and surrounding a hub gearshift mechanism, a shifting means for the hub gearshift mechanism, movable on the hub shaft; the hub gearshift mechanism comprising at least one claw clutch with a projecting claw part on a first gear element, movable between at least two clutch positions in which it cooperates with a counter-projecting claw part on an additional gear element for rotationally fixed coupling of the first gear element with the respective additional gear element; for each claw clutch there being included a driving member, movable on the hub shaft, which cooperates with the respective projecting claw part and is movable between gearshift positions which are associated with the clutch positions of the respective projecting claw part, and which is preloaded by a first preloading spring in a first preloading direction in an initial gearshift position.

The critical gearshift direction is the one in which the driving members are moved in a direction opposite to the preloading direction of the first spring, i.e., in the direction of pull in the case of a tension-loaded gearshift linkage of the shifting means, and in the direction of pressure in the case of a pressure-loaded gearshift linkage of the shifting means. According to an aspect of the invention, the driving member can be moved into all gearshift positions following in the respective direction, even when the respective projecting claw part is momentarily blocked because of improper orientation of the projecting claws or counterprojecting claws. After starting, or during riding, as soon as the hub gearshift mechanism is put into motion by pedaling, the projecting claw part, upon proper orientation, moves into the desired clutch position under the effect of the second preloading spring. This provides for speed preselection in a stationary hub gearshift mechanism.

Typically, shifting in the opposite direction is not problematic if suitable dead travel is provided at some point in the force transmission path between the driving member and the manual shift lever on the handlebar. For example, in the case of a tension-loaded gearshift linkage with a conventional cable connection between hub and manual shift lever, the cable can momentarily slacken upon a shift movement at standstill, until, after the hub gearshift mechanism is set in motion, the projecting claw part engages in the desired clutch position under the effect of the first preloading spring and again pulls the cable taut. In a pressure-loaded gearshift linkage, in accordance with a preferred embodiment of the invention, each driving member abuts a gearshift linkage part of the shifting means for joint movement of the driving member and gearshift linkage part into the selectable gearshift positions, and the gearshift linkage part is capable of moving away from the driving member, out of mutual abutment, in a direction parallel to the first preloading direction, into all gearshift positions of the gearshift linkage part following in this direction. Thus, there is dead travel within the hub, and the mechanical connection between hub and manual shift lever means can be free from dead travel. This is decidedly advantageous for precise adjustment of the shift positions of the manual shift lever means. Also, it is easy to assemble and disassemble the shifting means containing the gearshift linkage parts in the gear hub.

Preferably, the driving member is a stepped bolt, axially displaceable within the hub shaft and with an enlarged-diameter central section, with the first preloading spring resting on one axial end of the bolt, with the projecting claw part resting on the other axial end of the bolt, and with the second preloading spring engaging on the side of the projecting claw part away from the central section. The driving member can be produced inexpensively. Also, due to its stepped shape, assembly and disassembly are facilitated.

In a particularly preferred embodiment of the invention, the hub gearshift mechanism consists of a multi-step planetary gear, with two claw clutches, namely a first one for the sun wheels and a second one for ring gear and planet wheel carrier. Preferably, the first claw clutch has a projecting claw part for selective, rotationally fixed coupling of one or several (advantageously three) sun wheels of a planetary gear with the hub shaft.

For compactness, the first and the second preloading springs are each disposed in an annular space between end sections of the stepped bolt on either side of the central section and an inner peripheral surface of the hollow hub shaft. The associated gearshift linkage part may abut the front end (in the direction of the first preloading direction) of the stepped bolt, and, for movement between the gearshift positions, the gearshift linkage may be capable of being acted on with suitable pressure by the shifting means. The driving member may consist of a shift block which is supported axially displaceable on the hub shaft, with the first preloading spring engaging at one axial end of the shift block, with a carrier part holding the projecting claw part abutting at the other end, and with the second preloading spring engaging at the axial end of the carrier part away from the shift block.

Preferably, the projecting claw part of the other claw clutch includes a planet wheel carrier or a ring gear of a planetary gear, for selective, rotationally fixed coupling of a carrier part which is coupled rotationally fixed with a driver gear wheel of the multi-speed gear hub. The projecting claw part may further serve for selective activation and deactivation of an overriding clutch, preferably a ratchet coupling, coupling the ring gear with the hub sleeve.

Each of the first and second preloading springs may surround the hub shaft.

An associated gearshift linkage part may abut the front end (in the direction of the first preloading direction) of the shift block, and, for shifting into selectable gearshift positions, may be capable of being acted on by the shifting means by suitable pressure.

For compactness, the gearshift linkage part associated with the shift block may be a sleeve, and the gearshift linkage part associated with the stepped bolt may be a pin which is displaceable within the sleeve.

BRIEF DESCRIPTION OF THE DRAWING

A preferred embodiment of the invention is described below with reference to the drawing, wherein.

DETAILED DESCRIPTION

Figure 1:
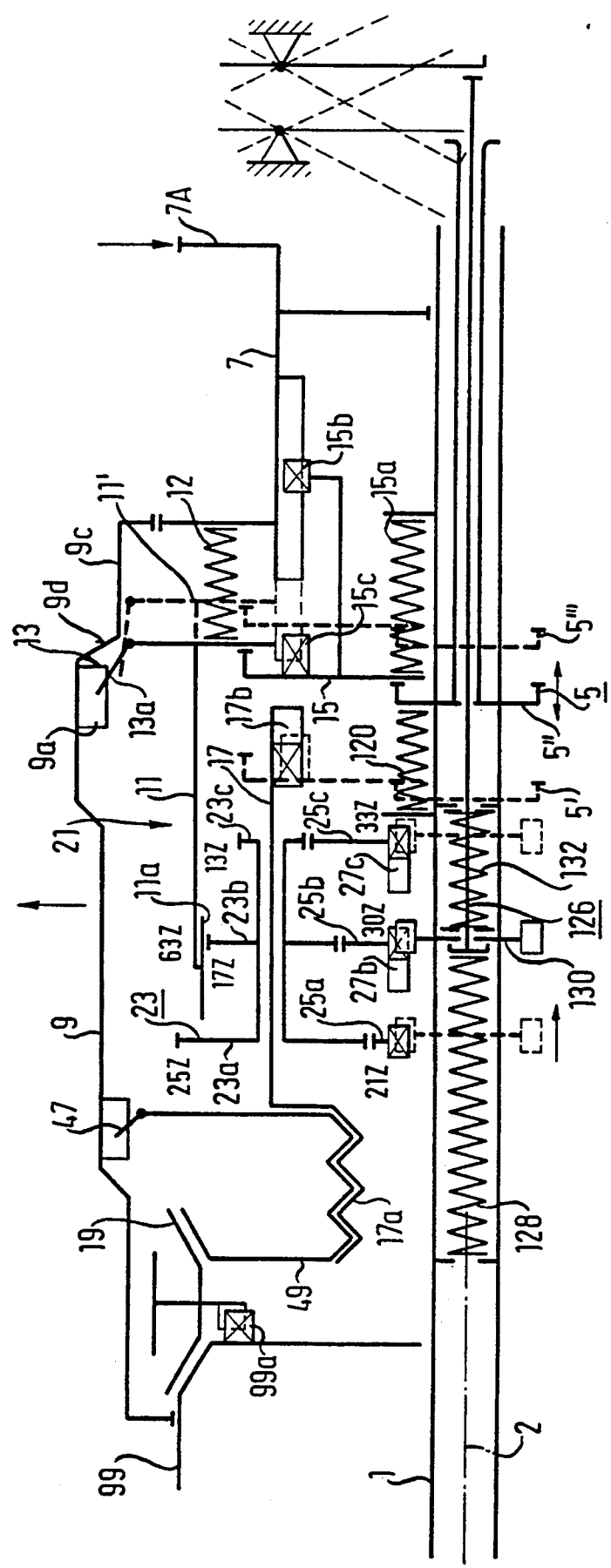
FIG. 1 is a schematic of a multi-speed gear hub.
Figure 2:
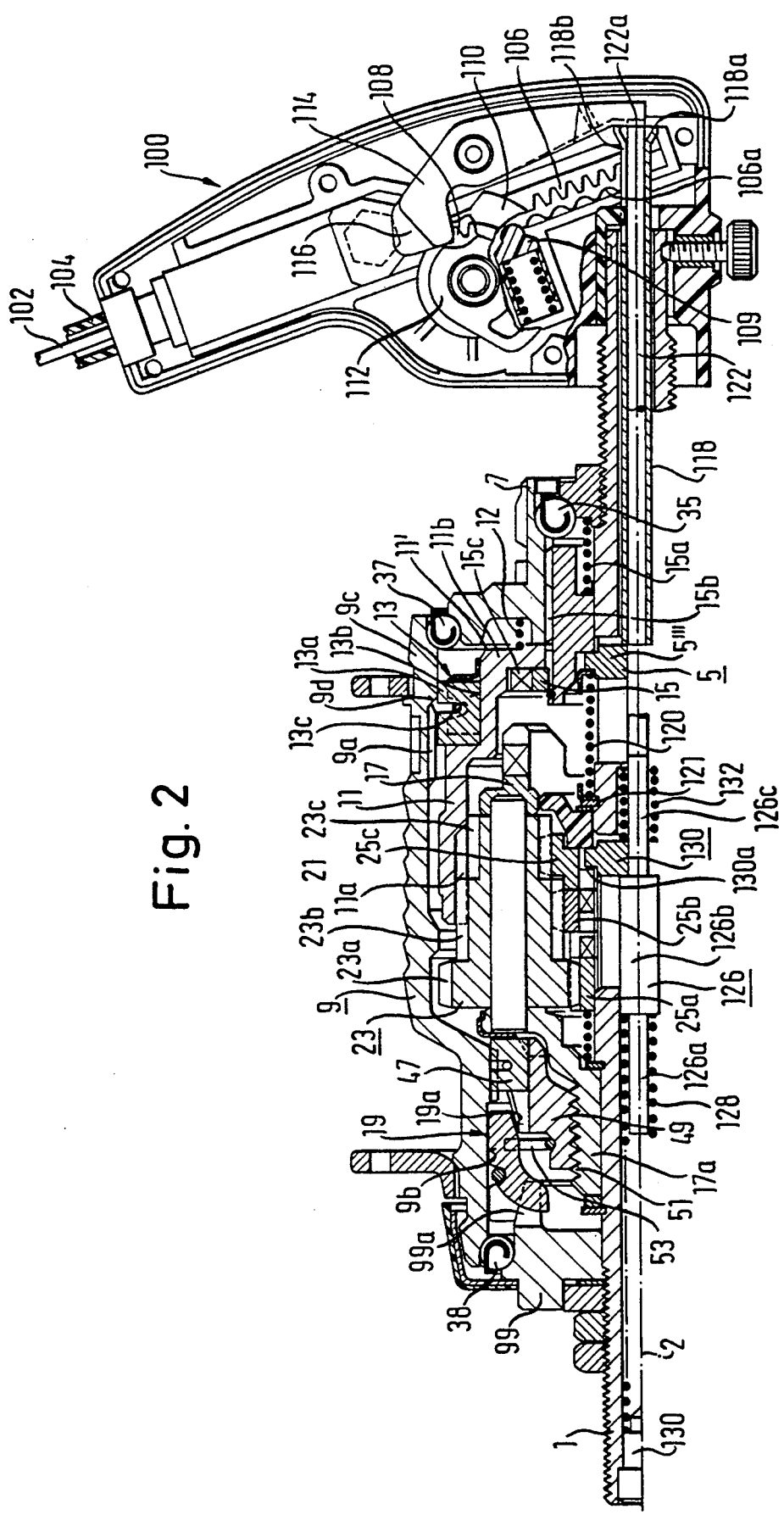
FIG. 2 is a radial section of the multi-speed gear hub according to FIG. 1.

FIGS. 1 and 2 show a 7-speed gear hub with coaster brake for a bicycle, with a hub shaft 1 mounted rotationally fixed on a bicycle frame (not shown). The longitudinal axis of the hub shaft 1 defines an axis of rotation 2 of the hub shaft. A driver 7 is rotatably supported on the hub shaft 1 by way of a ball bearing 35. One or several sprocket wheels (e.g., 7A in FIG. 1) are disposed on the driver 7, connected by a chain (not shown) with one or several sprocket wheels ("chain leaves") on the pedal bearing of the bicycle. A hub sleeve 9 connected with the bicycle rim by bicycle spokes (not shown) is rotatably supported on the driver 7 by an additional ball bearing 37, so that it is supported on the hub shaft 1. The other end of the hub sleeve 9 is rotatably supported on the hub shaft 1 by a ball bearing 38. In addition to a coaster brake, a planetary gear 21 is disposed within the tubular hub sleeve 9. The planetary gear consists of a ring gear 11, a planet wheel carrier 17, and one or several 3-stage planet wheels 23 which are uniformly distributed in a circle around the axis of rotation 2 and whose stages 23a, 23b and 23c are in constant mesh with associated sun wheels 25a, 25b and 25c. The inner peripheral toothing 11a of the ring gear 11 is in constant mesh with the middle gear wheel stage 23b. In FIG. 1, the respective numbers of teeth are given with an appended letter "Z".

The ring gear 11 is connected with the hub sleeve 9 via a freewheel (overriding clutch). The latter is formed by a ratchet lock 13 having ratchets 13a which are pivotable in ratchet recesses 13b of the ring gear 11, about their radially inner ends, with preloading of the ratchets for radially outward pivoting by a preloading spring (spring washer 13c) passing through a radial slot of the ratchets 13a. The ratchets 13a cooperate with coined, radially inward projecting catch projections 9a of the hub sleeve 9 so that the hub sleeve 9 is driven by the ratchets 13a when the gear ring 11 turns in the direction of drive rotation. It is assumed here that the gear ring 11, and hence the ratchet lock 13, is in the initial position shown in FIG. 1, into which it is biased by a preloading spring 12. In the disengaging position 11' of the gear ring 11, shown in FIG. 2 and indicated in FIG. 1 by a broken line, the ratchet lock 13 is kept out of engagement with the catch projections 9a, as these now abut the inner peripheral surface of a reduced-diameter end section 9c of the hub sleeve, with a transitional sloped surface 9d facilitating disengagement as indicated in FIGS. 1 and 2.

For shifting between different drive torque paths, a projecting claw part in the form of a clutch wheel 15 is included, which is supported axially displaceable on the hub shaft 1, with preloading in a left end position of FIGS. 1 and 2 by a first preloading spring 15a. The clutch wheel 15 is connected via a mutual grooved toothing 15b rotationally fixed with the driver 7, but displaceable, relative to the driver 7, parallel to the axis of rotation 2. Displacement against the force of the spring 15a is effected via a driving member in the form of a shift block 5. The latter can be shifted between three axial positions designated 5', 5" and 5'" from left to right. The middle position 5" is represented in FIG. 1, and the right-hand position 5'" in FIG. 2.

Actuation is by a shifting means 100 which is shown schematically in FIG. 2. A cable 102, rigid under tension and compression and guided in a sleeve 104 leads to the manual shift means on the handlebar. The cable is attached to a toothed rack 106 which engages a pinion 108. For indexing (catching), the toothed rack 106 has locking recesses 106a into which a spring-preloaded locking bolt 109 engages.

The pinion is connected rotationally rigid with two cam plates 110, 112 on which two-armed levers 114 and 116 abut as cam followers. As shown in FIG. 2, the front two-armed lever 114 abuts a widened, right end 118a of a sleeve 118 whose other end abuts the shift block 5. The shift block 5 is biased against the sleeve 118 by a second preloading spring 120. The end of the spring 120 away from the shift block 5 is supported on a ring 121 fixed on the hub shaft.

As shown in FIG. 2, the other two-armed lever 116 of the shifting means 100 abuts the right end 122a of a pin 122 which is displaceable inside the sleeve 118, a slot 118b of the sleeve 118, open toward the right, permitting pivoting of the two-armed lever 116 in the slot 118b. The other end of the pin 118 abuts the corresponding end of a stepped bolt 126. An additional spring 128 preloads the stepped bolt 126 toward the right, this preloading direction coinciding with the preloading direction of the aforementioned second spring 120. The left end of the spring 128 is supported on a radially inward-directed annular step 130 of the hub shaft 1, and the right end on a radial annular surface which is formed between an enlarged-diameter central section 126b and a reduced-diameter end section 126a of the stepped bolt 116, extending to the left. Also, a reduced-diameter end section 126c adjoins the other end of the central section 126b. With the radial annular surface between the end sections 126b and 126c, the central section 126b, under the effect of the spring 128, abuts a shift block 130, which serves for selective fixing of one of the three sun wheels 25a, 25b and 25c.

A second preloading spring 132, whose right end is supported by a radially inward-projecting collar of the hub 1, abuts the shift block 130 on the side away from the central section 126b. The elastic force of the spring 132 is less than that of the spring 128 (just as the spring 15a has less elastic force than the spring 120).

As a result, upon actuation of the shifting means 100, the two driving members (stepped bolt 126, shift block 5) can be moved to the left into any desired gearshift position even if the respective projecting claw part (shift block 130, clutch wheel 15) is momentarily blocked, as, with stationary hub gearshift mechanism, the projecting claws of the respective projecting claw part may fail to engage between the corresponding counterprojecting claws of a following clutch position. If later, upon turning of the pedal crank, the hub gearshift mechanism is put into operation, the corresponding projecting claw parts, upon reaching the proper rotational position, move under the effect of the respective spring 120 or 15a into the desired clutch position.

Conversely, with reference to FIG. 1 and 2, when the hub gearshift mechanism is stationary or moved slowly, shifting by movement of the respective gearshift linkage part (sleeve 118 or pin 122) to the right is readily possible without blocking of the manual shift means on the handlebar. In a corresponding shift movement, the respective two-armed lever 114 or 116 momentarily lifts from the associated gearshift linkage part until, when the hub gearshift mechanism is again put into operation, the respective projecting claw part engages in the intended clutch position under the effect of the respective spring 128 or 120, and the gearshift linkage part again comes to abut the two-armed lever.

Transmission of force from the planet wheel carrier 17 to the hub sleeve 9 is via a freewheel or overriding clutch in the form of a ratchet lock 47 like the ratchet lock 13 described above. This ratchet lock is inactive when the flow of force from the ring gear 11 is via the ratchet lock 13 to the hub sleeve 9, because then the hub sleeve turns faster than the planet wheel carrier 17, and the ratchet lock 27 is being passed by the hub sleeve 9. Included further is a coaster brake 19 which is activated by displacement of a brake cone 49. The brake cone 49 is supported on a bearing section 17a of the planet wheel carrier 17, via a coarse thread 51. If the planet wheel carrier 17 turns opposite the direction of drive, the brake cone 49, held in its respective position by a friction spring 53, shifts to the left to a counter-cone surface 19a of the brake 19, so as to press the brake 19 radially outward against an inner peripheral friction surface 9b of the hub sleeve 9. The brake 19, in the form of brake shoes, is secured against turning by axial projections 99a of a hub flange 99 mounted rotationally fixed on the hub shaft 1.

Shifting between gears is facilitated by sloped deflecting surfaces 27b and 27c on the counterprojecting claw parts of the sun wheels 25b and 25c, as well as by sloped deflecting surfaces 17b on the counterprojecting claw parts of the planet wheel carrier 17. These surfaces serve to thread the claw projection 130a of the shift block 130 and the corresponding claw projections of the clutch wheel 15 in the form of a toothed star 15c between the corresponding counterprojecting claws of the sun wheels and the planet wheel carrier. The sloped deflecting surfaces also prevent through-pedaling on change of gear.

Figure 3:
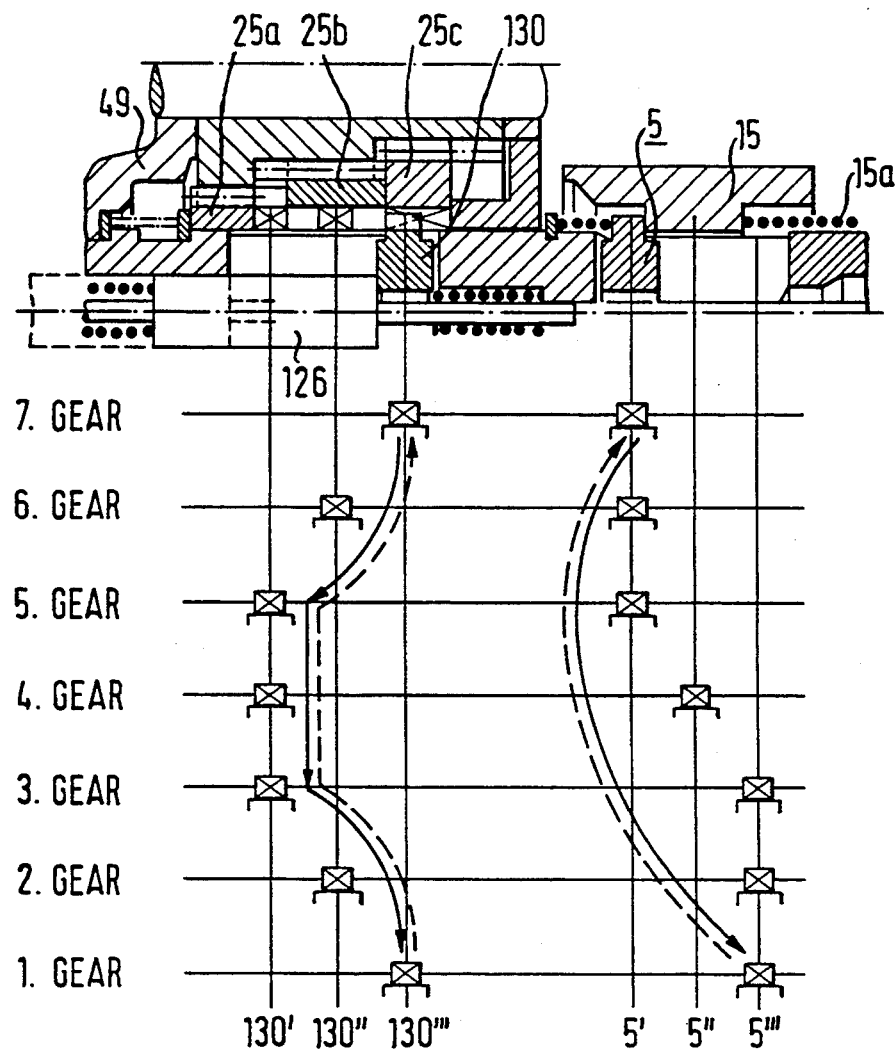
FIG. 3 is a schematic of a gear hub slightly different from the gear hub according to FIG. 2.

FIGS. 1 and 3 show the possible clutch positions 5', 5" and 5'" of the shift block 5, with associated respective gearshift positions of the clutch wheel 15. Also shown are respective gearshift positions 130', 130" and 130'" of the shift block 130, with associated clutch positions of the stepped bolt 126.

In the gearshift position shown in FIG. 3 (7th gear=-high gear), the drive torque is transmitted from the driver 7 via the clutch wheel 15 to the toothed star 15c and from there to the planet gear carrier 17. The planet wheels 23 on the planet wheel carrier 17 roll off the largest sun wheel 25c which is connected rotationally fixed with the hub shaft 1, thus driving the ring gear 11 which is in constant mesh with the middle stage 23b of the planet wheels 23. The ring gear 11 in turn drives the hub sleeve 9 via the ratchet lock 13. Here, the rotational speed of the ring gear and hence of the hub sleeve 9 is always greater than that of the planet wheel carrier 17 and hence of the driver 7. Thus, gearing is toward high speed, with gear ratio the larger, the larger the sun wheel currently rotationally fixed to the hub shaft 2.

If the shift block is shifted toward the right by corresponding actuation of the shifting means 100 (pivoting of the corresponding two-armed lever 114 counterclockwise in FIG. 2) until the toothed star 15c abuts a radially extending floor 11b of the ring gear 11, the toothed star 15c of the clutch wheel 15 engages a corresponding inner toothing of the floor 11b of the ring gear 11. This results in direct transmission, with gear ratio 1:1. The flow of force is from the driver 7 via the clutch wheel 15 directly to the ring gear and then via the ratchet lock 13 directly to the hub sleeve 9.

If, as shown in FIG. 2, the shift block 5 is shifted from the middle position 5″ further into its extreme right position 5‴, the ring gear 11 is driven to the right by the toothed star 15c. As a result, the ratchet lock 13, still engaged with the hub sleeve 11, is also shifted toward the right. In the course of this shift, a deflecting slope 9d indicated in FIG. 1 the inner periphery of the hub sleeve 9, pivots all ratchets 13a radially inward, sufficient for disengagement from the projections 9a. Force now flows from the driver 7 via the clutch wheel 19, the ring gear 11, the planet wheels 23, the planet wheel carrier 17 and the ratchet lock 27 to the hub sleeve 9. Thus, in the extreme right position 5‴ of the shift block 5′, the ring gear 11 is driven directly by the driver 7, so that gearing of the gear hub is to slower speeds (hill gears). The hill gear with the greatest gearing reduction (1st gear according to FIG. 3) is obtained by fixing the largest sun wheel 35c on the hub shaft 2, as shown in FIG. 2. If the middle sun wheel 25b is fixed, a smaller gear ratio results, and a still smaller gear ratio results if the small sun wheel 25a is fixed.

Accordingly, the highest speed, with the greatest gear ratio (7th gear according to FIG. 3) is obtained in the extreme left position 5′ of the shift block 5, with the large sun wheel 25c fixed. By fixing the sun wheel 25b, a medium gear ratio is obtained, and a lesser high-speed ratio is obtained by fixing the small sun wheel 25c.

Only in the middle position 5″ of the shift block 5 (direct speed=4th gear according to FIG. 3) is the 3-stage planetary gear 21 essentially inactive. As with the high speeds (5th to 7th gear), the ratchet lock 47 is being passed by the faster-running hub sleeve 9. Thus, in direct drive, it makes no difference which of the sun wheels 25 is rotationally fixed on the hub 1.

The above implies that, for shifting from one gear to the next, a single shift block (either shift block 5 or shift block 130) is moved, by a single step. The shift paths of the two shift blocks are optimally short and do not overlap in time.

The gear hub described above is distinguished in that in each mode of operation, and even with the hub gearshift mechanism stationary, the manual shift lever means on the handlebars (not shown) can be actuated for preselection of any desired gear. It is possible to "shift through" entirely, i.e., from one extreme speed (e.g., 7th gear) to the other extreme speed (e.g., 1st gear). Manual preselection of the 1st gear is of advantage especially when the bicycle is stopped in another gear (at a traffic light, for example), then to be driven off at a lower speed, e.g., 1st gear. In this gear preselection, the control movement of the shifting means, i.e., of the respective driving members (pin 122 or sleeve 118) out of the hub shaft 1 (to the right in the figures) is not problematic, as the respective two-armed levers 114 and 116 can turn in the desired direction (counterclockwise) even if the respective claw clutch is momentarily blocked because of angle mismatch between projecting and counterprojecting claw parts. On the other hand, control movement in the opposite direction, i.e., pushing of the respective gearshift linkage part (pin 122 or sleeve 118) into the hub shaft 1, would be problematic if the shift block 5 and the stepped bolt 126 were rigidly connected with the corresponding projecting claw part (clutch ring 15 with toothed star 15c or shift block 130 with clutch projection 31a). This problematic shift movement toward the left in the figures occurs in shifting through from 7th to 1st gear, namely in the transition from 7th to 5th gear with shift block 130, as well as in shifting through from 1st to 7th gear in the transition from the 1st to the 3rd gear with the shift block 130, and in the transition from the 3rd to the 5th gear with shift block 5. As soon as the hub gearshift mechanism is again put into operation upon pedalling, the respective projecting claw part engages in the preselected gearshift position under the force of the respective spring 15a or 126c.

According to FIG. 3, upon shifting through from 7th to 1st gear or vice-versa, the shift block 130 remains at rest, as contrasted with successive shifting of individual gears, in which the positions 130″ and 130′ are temporarily engaged.

I claim:

1. Multi-speed gear hub for bicycles, comprising:
   a hub shaft (1) mountable on a bicycle frame;
   a driver (7) rotatable about an axis of rotation (2) on the hub shaft (1);
   a hub sleeve (9) rotatable on the hub shaft (1);
   a hub gearshift mechanism (21) surrounded by the hub sleeve (9);
   a shifting means (100) for the hub gearshift mechanism (21) mounted to the hub shaft (1);
   wherein the hub gearshift mechanism (21) comprises at least one claw clutch with a projecting claw part (15c; 130) on a first gear element (7; 1), the projecting claw part (15c; 130) being movable between at least two clutch positions in which it cooperates with a counterprojecting claw part on an additional gear element (17, 11; 23a, 23b, 23c) for rotationally fixed coupling of the first gear element (7; 1) with the additional gear element (17, 11; 23a, 23b, 23c),
   wherein the claw clutch comprises a driving member (5; 126) which is movable on the hub shaft, which cooperates with the projecting claw part (15c; 130), which is movable between gearshift positions associated with clutch positions of the projecting claw part (15c; 130), and which is preloaded by a first preloading spring (120; 128) in a first preloading direction in an initial gearshift position,
   wherein the claw clutch comprises a second preloading spring (15a; 132) which preloads the projecting claw part (15c; 130) in a second preloading direction opposite to the first preloading direction, with less force than the first preloading spring (120; 128), for direct or indirect abutment of the driving member (5; 126), which driving member (5; 126) is displaceable from the projecting claw part (15c; 130) in a direction parallel to the second preloading direction, against the force of the first preloading spring (120; 128), into all directionally following gearshift positions, wherein the driving member comprises a stepped bolt (126) which is axially displaceable within the hub shaft (1) and which has an enlarged-diameter central section (126b) and axially opposite end sections (126a; 126c), one axial end of the stepped bolt (126) supporting the first preloading spring (128), another axial end of the stepped bolt (126) supporting the projecting claw part (130), and wherein the second preloading spring (132) engages the projecting claw part (130) on a side away from the central section (126b).

2. Multi-speed gear hub according to claim 1, wherein the projecting claw part (130) is adapted for selective, rotationally fixed coupling between the hub shaft (1) and at least one sun wheel (25a,25b,25c) of the hub shift gear mechanism.

3. Multi-speed gear hub according to claim 1, wherein the first and the second preloading springs (128;132) are disposed in an annular space between the end sections (126a;126c) of the stepped bolt (126) and an inner peripheral surface of the hollow hub shaft (1).

4. Multi-speed gear hub according to claim 1, wherein the gearshift linkage part (122) abuts an end of the stepped bolt (126) in the first preloading direction and, for movement between gearshift positions, is receptive to pressure by the shifting means (100).

5. Multi-speed gear hub according to claim 1, wherein each of the first and second preloading springs (120;15a) surrounds the hub shaft (1).

6. Multi-speed gear hub according to claim 1, wherein a first gearshift linkage part is a sleeve (118) associated with the shift block (5), and wherein a second gearshift linkage part, associated with the stepped bolt (126), is a displaceable pin (122) within the sleeve (118).

7. Multi-speed gear hub according to claim 2, wherein rotationally fixed coupling is between the hub shaft (1) and three sun wheels (25a,25b,25c).

8. Multi-speed gear hub for bicycles, comprising:
a hub shaft (1) mountable on a bicycle frame;
a driver (7) rotatable about an axis of rotation (2) on the hub shaft (1);
a hub sleeve (9) rotatable on the hub shaft (1);
a hub gearshift mechanism (21) surrounded by the hub sleeve (9);
a shifting means (100) for the hub gearshift mechanism (21) mounted to the hub shaft (1);
wherein the hub gearshift mechanism (21) comprises a first claw clutch and a second claw clutch, each with a respective projecting claw part (15c; 130) on a respective first gear element (7; 1), each projecting claw part (15c; 130) being movable between at least two clutch positions in which it cooperates with a respective counterprojecting claw part on a respective additional gear element (17, 11; 23a, 23b, 23c) for rotationally fixed coupling of the respective first gear element (7; 1) with the respective additional gear element (17, 11; 23a, 23b, 23c), wherein the first claw clutch and the second claw clutch each comprises a respective driving member (5; 126) which is movable on the hub shaft, which cooperates with the respective projecting claw part (15c; 130), which is movable between gearshift positions associated with clutch positions of the respective projecting claw part (15c; 130), and which is preloaded by a respective first preloading spring (120; 128) in a respective first preloading direction in an initial gearshift position, wherein the first claw clutch and the second claw clutch each comprises a respective second preloading spring (15a; 132) which preloads the respective projecting claw part (15c; 130) in a respective second preloading direction opposite to the respective first preloading direction, with less force than the respective first preloading spring (120; 128), for direct or indirect abutment of the respective driving member (5; 126), which respective driving member (5; 126) is displaceable from the respective projecting claw part (15c; 130) in a direction parallel to the respective second preloading direction, against the force of the respective first preloading spring (120; 128), into all directionally following gearshift positions, wherein the driving member (5; 126) of each claw clutch abuts a respective gearshift linkage part (118; 122) of the shifting means (100), for joint movement of the respective driving member (5; 126) and the respective gearshift linkage part (118; 122) into selectable gearshift positions, and wherein the respective gearshift linkage part (118; 122) is displaceable from the respective driving member (5, 126), in a direction parallel to the respective first preloading direction, into all directionally following gearshift positions of the respective gearshift linkage part (118; 122).

9. Multi-speed gear hub according to claim 8, wherein the first gearshift linkage part (118) connects the driving member (5) of the first claw clutch with the shifting means (100), and wherein the second gearshift linkage part (122) connects the driving member (126) of the second claw clutch with the shifting means (100).

10. Multi-speed gear hub according to claim 8, wherein the driving member of the first claw clutch comprises a shift block (5), supported axially displaceable on the hub shaft (1), wherein the first preloading spring (120) of the first claw clutch engages on one axial end of the shift block (5), wherein a carrier part (15) comprising the projecting claw part (15c) of the first claw clutch abuts another axial end of the shift block (5), and wherein the second preloading spring of the first claw clutch engages an axial end of the carrier part (15) away from the shift block (5).

11. Multi-speed gear hub according to claim 8, wherein, for selective, rotationally fixed coupling of the carrier part (15) with a driver gear wheel (7A) of the multi-speed gear hub, the projecting claw part (15c) of the first claw clutch comprises a planet wheel carrier (17) or a ring gear (11) of a planetary gear (21).

12. Multi-speed gear hub according to claim 8, wherein, with respect to the first preloading direction of the first claw clutch, the gearshift linkage part (118) of the first claw clutch abuts a front end of the shift block (5) and, for shifting into selectable gearshift positions, is capable of being acted on with pressure by the shifting means (100).

13. Multi-speed gear hub according to claim 8, wherein the projecting claw part (15c) is adapted for selective activation and deactivation of an overriding clutch which couples the ring gear (11) with the hub sleeve (9).

14. Multi-speed gear hub according to claim 8, wherein the overriding clutch is a ratchet coupling (13).

* * * * *

UNITED STATES PATENT AND TRADEMARK OFFICE
CERTIFICATE OF CORRECTION

PATENT NO. : 5,445,573
DATED : August 29, 1995
INVENTOR(S) : Günter Nürnberger

It is certified that error appears in the above-indentified patent and that said Letters Patent is hereby corrected as shown below:

Col. 7, line 28, "FIG. 1" should read --Fig. 1 on--;
Col. 10, line 47, "claim 8" should read --claim 10--;
Col. 10, line 54, "claim 8" should read --claim 10--;
Col. 10, line 61, "claim 8" should read --claim 11--;
Col. 10, line 65, "claim 8" should read --claim 13--.

Signed and Sealed this

Second Day of January, 1996

Attest:

BRUCE LEHMAN

Attesting Officer     Commissioner of Patents and Trademarks